US012631939B1

(12) United States Patent
Wang et al.

(10) Patent No.: US 12,631,939 B1
(45) Date of Patent: May 19, 2026

(54) MANAGING OPTICAL NONLINEARITIES AND OPTICAL MODE SORTING

(71) Applicant: SensorQ Technologies Inc., Cambridge, MA (US)

(72) Inventors: Christine Y. Wang, Riverdale Park, MD (US); Saikat Guha, Washington, DC (US)

(73) Assignee: SensorQ Technologies Inc., Cambridge, MA (US)

( * ) Notice: Subject to any disclaimer, the term of this patent is extended or adjusted under 35 U.S.C. 154(b) by 0 days.

(21) Appl. No.: 19/310,212

(22) Filed: Aug. 26, 2025

(51) Int. Cl.
| | |
|---|---|
| *G02F 1/35* | (2006.01) |
| *G02F 1/21* | (2006.01) |
| *G06N 3/067* | (2006.01) |

(52) U.S. Cl.
CPC ............ *G02F 1/3507* (2021.01); *G02F 1/217* (2021.01); *G06N 3/0675* (2013.01)

(58) Field of Classification Search
CPC ........................ G02F 1/35–397; G06N 3/0675
See application file for complete search history.

(56) References Cited

U.S. PATENT DOCUMENTS

| | | | |
|---|---|---|---|
| 10,007,866 B2 | 6/2018 | Criminisi et al. | |
| 10,268,232 B2 * | 4/2019 | Harris ..................... | G06E 3/005 |
| 11,334,107 B2 | 5/2022 | Carolan et al. | |
| 11,392,830 B2 | 7/2022 | Ozcan et al. | |
| 11,914,415 B2 | 2/2024 | Carolan et al. | |

| | | |
|---|---|---|
| 12,020,150 B2 | 6/2024 | Guo |
| 12,086,717 B2 | 9/2024 | Ozcan et al. |
| 12,229,662 B2 | 2/2025 | Du et al. |
| 2018/0262291 A1 | 9/2018 | Doster et al. |

(Continued)

FOREIGN PATENT DOCUMENTS

| | | | | |
|---|---|---|---|---|
| CA | 3046887 A1 | 12/2020 | | |
| WO | WO-2025101228 A2 * | 5/2025 | ............ | G06N 10/20 |
| WO | 2025169189 A1 | 8/2025 | | |

OTHER PUBLICATIONS

Michael R. Grace et al. "Approaching quantum-limited imaging resolution without prior knowledge of the object location", J. Opt. Soc. Am. A, vol. 37, No. 8, 22 pages, 2020, DOI: 10.1364/JOSAA. 392116.

(Continued)

*Primary Examiner* — Rhonda S Peace
(74) *Attorney, Agent, or Firm* — Young Basile Hanlon & MacFarlane, P.C.

(57) ABSTRACT
An apparatus comprises: a plurality of linear optical elements, where each linear optical element is configured to apply a change in amplitude or phase of an optical wave interacting with that linear optical element; and a plurality of nonlinear optical elements, where each nonlinear optical element is configured to apply a change in an amplitude or a phase of an optical wave interacting with that nonlinear optical element, where the change in an amplitude or a phase is a nonlinear function of an amplitude or a phase of the optical wave; wherein one or more nonlinear optical elements are arranged to interact with an optical wave between successive interactions of the optical wave with two linear optical elements; wherein the plurality of linear optical elements is configured to sort optical waves into one or more optical modes of a sorted mode distribution.

23 Claims, 15 Drawing Sheets

(56)             References Cited

U.S. PATENT DOCUMENTS

| | | |
|---|---|---|
| 2021/0192342 A1* | 6/2021 | Hughes ................ G06N 3/0675 |
| 2022/0253685 A1 | 8/2022 | Ozcan et al. |
| 2023/0368012 A1 | 11/2023 | Yu et al. |
| 2024/0212095 A1 | 6/2024 | Maltese et al. |
| 2025/0060775 A1 | 2/2025 | Guo et al. |
| 2025/0110382 A1 | 4/2025 | Russo et al. |
| 2025/0200351 A1 | 6/2025 | Spall et al. |

OTHER PUBLICATIONS

Michael R. Grace et al. "Identifying Objects at the Quantum Limit for Superresolution Imaging", American Physical Society, Physical Review Letters, vol. 129, No. 18, 7 pages, 2022, DOI: 10.1103/PhysRevLett.129.180502.

Itay Ozer et al., "Adaptive Super-Resolution Imaging Without Prior Knowledge Using a Programmable Spatial-Mode Sorter", arXiv, 17 pages, 2024, DOI: 10.48550/arXiv.2409.04323.

Jen-Tang Lu et al., "Nonlinear Imaging using Object-Dependent Illumination", Sci Rep, vol. 9, No. 725, 7 pages, 2019, DOI: 10.1038/s41598-018-37030-7.

Tianyu Wang et al., "Image sensing with multilayer nonlinear optical neural networks", Nat. Photon., vol. 17, 12 pages, 2023, DOI: 10.1038/s41566-023-01170-8.

Christopher Barsi et al., "Nonlinear Abbe theory", Nature Photon, vol. 7, pp. 639-643, 2013, DOI: 10.1038/nphoton.2013.171.

J. Rocha et al., "Self-configuring high-speed multi-plane light conversion", Nature Communications, vol. 17, 14 pages, Jan. 23, 2025, DOI: 10.1038/s41467-025-66798-2.

Extended European Search Report issued in corresponding EP Application No. 25207052.9, dated Jan. 29, 2026.

\* cited by examiner

MANAGING OPTICAL NONLINEARITIES AND OPTICAL MODE SORTING

TECHNICAL FIELD

This disclosure relates to managing optical nonlinearities and optical mode sorting.

BACKGROUND

Implementations of artificial intelligence (AI), such as machine learning (ML), have increasingly been applied in practical applications such as data processing and autonomous systems. Some implementations of artificial intelligence leverage neural networks that are configured to run on specialized circuitry or processors. Some processors optimize factors such as performance, energy efficiency, and cost. In some examples, a processor can be configured to manipulate photonic fields to perform computations. Some photonic processing devices can comprise optical waveguiding structures or optical circuits configured to guide optical waves in the optical wavelength region of the electromagnetic spectrum. Some electromagnetic waves have a spectrum that has a peak wavelength that falls in a particular range of optical wavelengths (e.g., between about 100 nm to about 1 mm, or some subrange thereof), also referred to as optical waves, light waves, or simply light. In some implementations, optical waves can be associated with one or more optical modes (e.g., spatial modes). In some implementations, an optical structure can be configured to guide optical waves based at least in part on optical modes associated with optical waves.

SUMMARY

In one aspect, in general, an apparatus comprises: a mode sorter module configured to sort optical waves into one or more optical modes of a plurality of optical modes of a sorted mode distribution; and an optical circuit comprising a plurality of input ports, where each input port of the plurality of input ports is configured to receive a respective mode of the plurality of optical modes of the sorted mode distribution, a plurality of tunable linear optical modules, each tunable linear optical module of the plurality of tunable linear optical modules comprising one or more inputs and one or more outputs, a plurality of nonlinear optical portions, where each nonlinear optical portion of the plurality of nonlinear optical portions is configured to provide a change in an amplitude or a phase of an optical wave propagating through that nonlinear optical portion of the plurality of nonlinear optical portions, and a plurality of output ports; wherein each output of each tunable linear optical module of the plurality of tunable linear optical modules is connected to an output port of the plurality of output ports or to an input of another tunable linear optical module of the plurality of tunable linear optical modules by a nonlinear optical portion of the plurality of nonlinear optical portions; wherein each input port of the plurality of input ports is connected to an input of a tunable linear optical module of the plurality of tunable linear optical modules.

Aspects can include one or more of the following features.

Each tunable linear optical module of the plurality of tunable linear optical modules comprises a tunable interferometer module comprising at least two inputs and at least two outputs.

Each tunable interferometer module comprises a first optical beamsplitter and a second optical beamsplitter, where the first optical beamsplitter is in optical communication with two inputs of the at least two inputs of that tunable interferometer module, the first optical beamsplitter is in optical communication with the second optical beamsplitter, and the second optical beamsplitter is in optical communication with two outputs of the at least two outputs of that tunable interferometer module.

Each tunable interferometer module comprises a first phase shifter configured to apply a phase shift to an optical wave propagating through the first phase shifter and a second phase shifter configured to apply a phase shift to an optical wave propagating through the second phase shifter.

The first phase shifter is in optical communication with an input of the at least two inputs of that tunable interferometer module and the second phase shifter is in optical communication with each of the first optical beamsplitter and the second optical beamsplitter of that tunable interferometer module.

The change in an amplitude or a phase of an optical wave by each nonlinear optical portion of the plurality of nonlinear optical portions is a nonlinear function of an amplitude or a phase of the optical wave.

The optical circuit comprises optical circuitry on a photonic integrated circuit chip.

In another aspect, in general, a method comprises: providing a mode sorter module configured to sort optical waves into one or more optical modes of a plurality of optical modes of a sorted mode distribution; arranging an optical circuit comprising a plurality of input ports, a plurality of tunable linear optical modules, each tunable linear optical module of the plurality of tunable linear optical modules comprising one or more inputs and one or more outputs, a plurality of nonlinear optical portions, where each nonlinear optical portion of the plurality of nonlinear optical portions is configured to provide a change in an amplitude or a phase of an optical wave propagating through that nonlinear optical portion of the plurality of nonlinear optical portions, and a plurality of output ports; and coupling each optical mode of the plurality of optical modes of the sorted mode distribution into a respective input port of the plurality of input ports of the optical circuit; wherein each output of each tunable linear optical module of the plurality of tunable linear optical modules is connected to an output port of the plurality of output ports or to an input of another tunable linear optical module of the plurality of tunable linear optical modules by a nonlinear optical portion of the plurality of nonlinear optical portions; wherein each input port of the plurality of input ports is connected to an input of a tunable linear optical module of the plurality of tunable linear optical modules.

Aspects can include the following feature.

The coupling comprises, for each optical mode of the plurality of optical modes, aligning an optical fiber to receive at least a portion of an optical wave associated with that mode of the plurality of optical modes, and aligning the optical fiber to provide the at least a portion of the optical wave associated with the mode of the plurality of optical modes to a respective input port of the plurality of input ports.

In another aspect, in general, an apparatus comprises: a plurality of linear optical elements, where each linear optical element of the plurality of linear optical elements is configured to apply a change in amplitude or phase of an optical wave interacting with that linear optical element of the plurality of linear optical elements; and a plurality of nonlinear optical elements, where each nonlinear optical element of the plurality of nonlinear optical elements is configured to apply a change in an amplitude or a phase of an optical wave interacting with that nonlinear optical element of the plurality of nonlinear optical elements, where the change in an amplitude or a phase is a nonlinear function of an amplitude or a phase of the optical wave; wherein one or more nonlinear optical elements of the plurality of nonlinear optical elements are arranged to interact with an optical wave between successive interactions of the optical wave with two linear optical elements of the plurality of linear optical elements; wherein the plurality of linear optical elements is configured to sort optical waves into one or more optical modes of a sorted mode distribution.

Aspects can include one or more of the following features.

Each linear optical element of the plurality of linear optical elements comprises a respective transmissive or reflective linear optical element.

Each of the plurality of linear optical elements and the plurality of nonlinear optical elements are arranged over a respective plurality of planes, where each plane of the plurality of planes is substantially parallel to a common plane that is substantially perpendicular to a propagation direction of an optical wave to which a phase modulation is applied.

Sets of nonlinear optical elements of the plurality of nonlinear optical elements are interspersed between sets of linear optical elements of the plurality of linear optical elements.

The plurality of linear optical elements is arranged over a first plane and the plurality of nonlinear optical elements is arranged over a second plane that is substantially parallel to the first plane.

The apparatus further comprises a reflective optical element that is coplanar with a third plane that is substantially parallel to the first plane, where the plurality of nonlinear optical elements is between the plurality of linear optical elements and the reflective optical element.

The plurality of linear optical elements is configured to sort optical waves into one or more optical modes of the sorted mode distribution based at least in part on a set of training data.

Each nonlinear optical element of the plurality of nonlinear optical elements is configured to apply a change in an amplitude or a phase of an optical wave interacting with that nonlinear optical element of the plurality of nonlinear optical elements in response to an electric field or optical field applied to that nonlinear optical element of the plurality of nonlinear optical elements.

In another aspect, in general, a method comprises: applying to an optical wave, using each linear optical elements of a plurality of linear optical elements, a change in amplitude or phase of the optical wave interacting with that linear optical element of the plurality of linear optical elements; applying to the optical wave, using each nonlinear optical element of a plurality of nonlinear optical elements, a change in an amplitude or a phase of the optical wave interacting with that nonlinear optical element of the plurality of nonlinear optical elements, where the change in an amplitude or a phase is a nonlinear function of an amplitude or a phase of the optical wave; and sorting, based at least in part on a collective change in amplitude or phase applied to the optical wave using the plurality of linear optical elements, portions of the optical wave into one or more optical modes of a sorted mode distribution; wherein one or more nonlinear optical elements of the plurality of nonlinear optical elements are arranged to interact with the optical wave between successive interactions of the optical wave with two linear optical elements of the plurality of linear optical elements.

Aspects can include one or more of the following features.

Each nonlinear optical element of the plurality of nonlinear optical elements is configured to apply a change in an amplitude or a phase of the optical wave interacting with that nonlinear optical element of the plurality of nonlinear optical elements in response to an electric field or optical field applied to that nonlinear optical element of the plurality of nonlinear optical elements.

Each of the plurality of linear optical elements and the plurality of nonlinear optical elements are arranged over a respective plurality of planes, where each plane of the plurality of planes is substantially parallel to a common plane that is substantially perpendicular to a propagation direction of an optical wave to which a phase modulation is applied.

Aspects can have one or more of the following advantages.

Some of the techniques and methods disclosed herein can be used to configure a system that processes optical waves or optical fields. Some systems configured to process optical fields can be used as optical neural networks. In some examples, optical neural networks can be associated with increased processing rates of information. Some optical neural networks can encode data into spatial modes of optical waves and utilize mode sorting modules to process data. In some implementations, a mode sorting module can demultiplex spatial modes in a sub-Rayleigh regime such that the mode sorting module is associated with super-resolution imaging capabilities. Such implementations can allow for a reduction in physical device footprint and energy consumption.

In some implementations, an optical neural network can comprise a mode sorting module in optical communication with nonlinear optical elements. In some examples, nonlinear optical elements can be interspersed between elements of the mode sorting module to allow for efficient processing of optical waves propagating through the optical neural network. In some examples, nonlinear optical elements can be positioned on a photonic integrated circuit to leverage compact form factors associated with the photonic integrated circuits.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
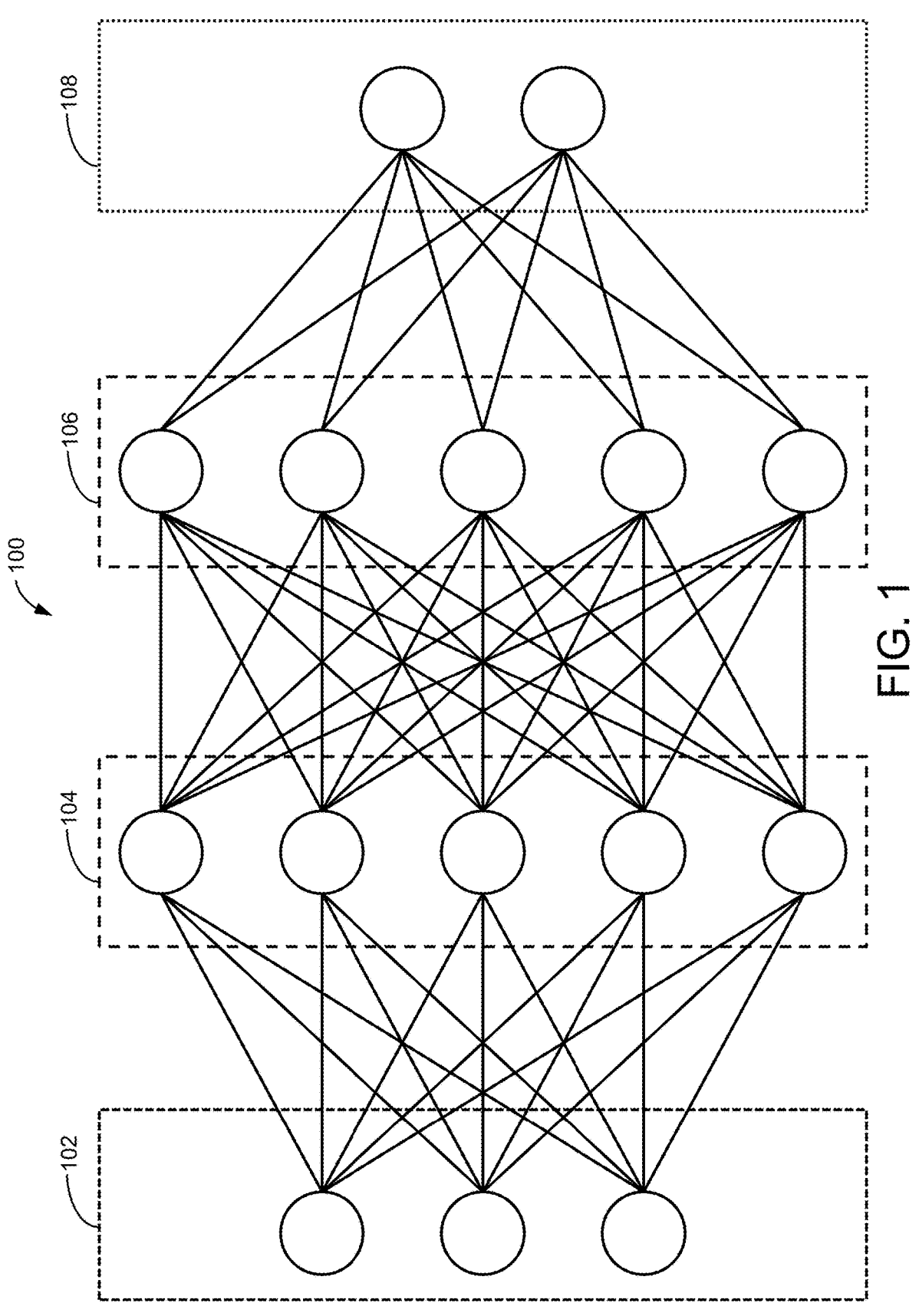
FIG. 1 is a schematic diagram of an example neural network.

Some implementations of machine learning are configured based on networks of neurons. In some examples, an artificial neural network (ANN) comprising layers of interconnected nodes, or neurons can be used to perform functions. Some ANNs comprise multiple layers of nodes, such as an input layer, hidden layer, and output layer. An example neural network 100 is shown in FIG. 1. The neural network 100 comprises an input layer 102 comprising a plurality of input nodes, a hidden layer 104 comprising a first plurality of nodes, a hidden layer 106 comprising a second plurality of nodes, and an output layer 108 comprising one or more output nodes. Some input layers can be configured to receive and assign data to neurons or nodes of a neural network. Some hidden layers can perform computations on the input data or data from nodes of a previous layer. Some implementations of computations can comprise receiving inputs from neurons in a previous layer and applying mathematical operations. Some mathematical operations can comprise linear transformations or nonlinear transformations of an input. In some examples, mathematical operations can include applying weights to determine an influence of an input on an output. Some output layers can produce a final prediction or result based on neurons from a layer. For instance, the output layer 108 can produce a result based on the hidden layer 106. In some examples, this prediction can be associated with a probability distribution of a plurality of results, wherein each result is associated with a respective weight. In some examples, data associated with each of the layers or weights can be represented by vectors or matrices.

Some system can comprise optical components configured to emulate a neural network, i.e., as an optical neural network. Some optical neural networks comprise components that are configured to propagate and manipulate light. A system can be implemented in various configurations, including as a single apparatus or as a combination of one or more apparatuses that collectively perform the functions of a system. In some examples, the one or more apparatuses can form a device, i.e., a system-on-a-chip, or the one or more apparatuses can be separate devices. Some systems can be configured based on a method or can be configured to perform a method or methods.

Some systems configured as optical neural networks can comprise elements, or a plurality thereof, configured to provide or apply a modulation, i.e., a phase modulation or an amplitude modulation, to an optical wave, i.e., an electromagnetic field, interacting with the element. In some implementations, phase modulation or an amplitude modulation provided by an element can be expressed as a function of a phase or amplitude of an electromagnetic field. In some examples, an amplitude of an electromagnetic field can be quantified as an intensity, i.e., proportional to an amplitude squared, or as an amount of power, i.e., an intensity collected over a given area.

Some optical neural networks can comprise modulating elements, or a plurality thereof, configured to apply a change in an amplitude or phase to an optical wave, where the change in an amplitude or a phase is a linear function of an amplitude or a phase of the optical wave. In some examples, these modulating elements can be referred to as linear optical elements. Some modulating elements can apply a modulation to an optical wave in response to an external field, such as an electrical field or an optical field, applied to the modulating element. For instance, some modulating elements can comprise materials such as liquid crystals or optical metamaterials. In some implementations, a modulating element can used to emulate linear transformation in a neural network.

Some optical neural networks can comprise a nonlinear optical element, or a plurality thereof, configured to control an optical property associated with an optical wave interacting with the nonlinear optical element. For instance, a nonlinear optical element can control an optical property such as optical power or optical intensity through processes such as stimulated emission or absorption. Some nonlinear optical elements can be configured to provide or apply a change in an amplitude or a phase of an optical wave interacting with the nonlinear optical element, where the change in an amplitude or a phase is a nonlinear function of an amplitude or a phase of the optical wave or a function of an interaction between the optical wave and one or more other optical waves. Applying a change in an amplitude of an optical wave results in a change in intensity of the optical wave since the intensity corresponds to the amplitude squared. Some nonlinear optical elements can apply an intensity change to an optical wave by providing an optical gain to an optical wave. Some nonlinear optical elements can also be configured to convert power from one optical wavelength or mode to another through nonlinear conversion. In some implementations, nonlinear optical elements can emulate nonlinear transformations of a neural network. Some implementations of nonlinear optical elements can comprise a passive nonlinear optical element that is configured to apply an intensity change to an optical wave based on a nonlinear property of a material associated with the passive nonlinear optical element. Some passive nonlinear optical elements can comprise materials such as saturable absorbers.

Some nonlinear optical elements can comprise an active nonlinear optical element that is configured to apply an intensity change to an optical wave based on a control signal applied to the nonlinear optical element. Some examples of control signals include optical or electrical pumping, mechanical deformation, and temperature. In some examples, optical or electrical pumping results in a nonlinear gain to an optical wave, such as gain saturation or threshold behavior. In some examples, electrical pumping can be associated with an electrical power, current, or voltage applied to a nonlinear optical element. Some nonlinear optical elements can control an optical property based at least in part on an applied electrical field characterized by an electro-optic effect. Examples of electro-optical effects include: (1) the Franz-Keldysh effect, (2) the quantum-confined Stark effect, (3) the Pockels effect, (4) the plasma dispersion effect or (5) the Kerr effect. In some examples, an electro-optic effect can be associated with a nonlinear property, such as a nonlinear optical susceptibility, of a material. For instance, the Pockels effect, sometimes called the linear electro-optic effect, can be associated with a $\chi^{(2)}$ electric susceptibility of a material. The Kerr effect, sometimes called the quadratic electro-optic effect, can be associated with a $\chi^{(3)}$ electric susceptibility of a material. In some examples, a nonlinear material can control an optical property associated with an optical mode, such as optical phase, based at least in part on an external electrical field through an electro-optic effect such as the Kerr effect. Some nonlinear optical elements can control an optical property of an optical mode based at least in part on an applied temperature modulation through the thermo-optic effect or an acoustic wave through the acousto-optic effect. Some active nonlinear optical elements can comprise materials that are non-centrosymmetric or lack inversion symmetry, such as mono-potassium phosphate (KDP), lithium niobate, beta-barium borate (BBO) or barium titanate (BTO).

Figure 2A:
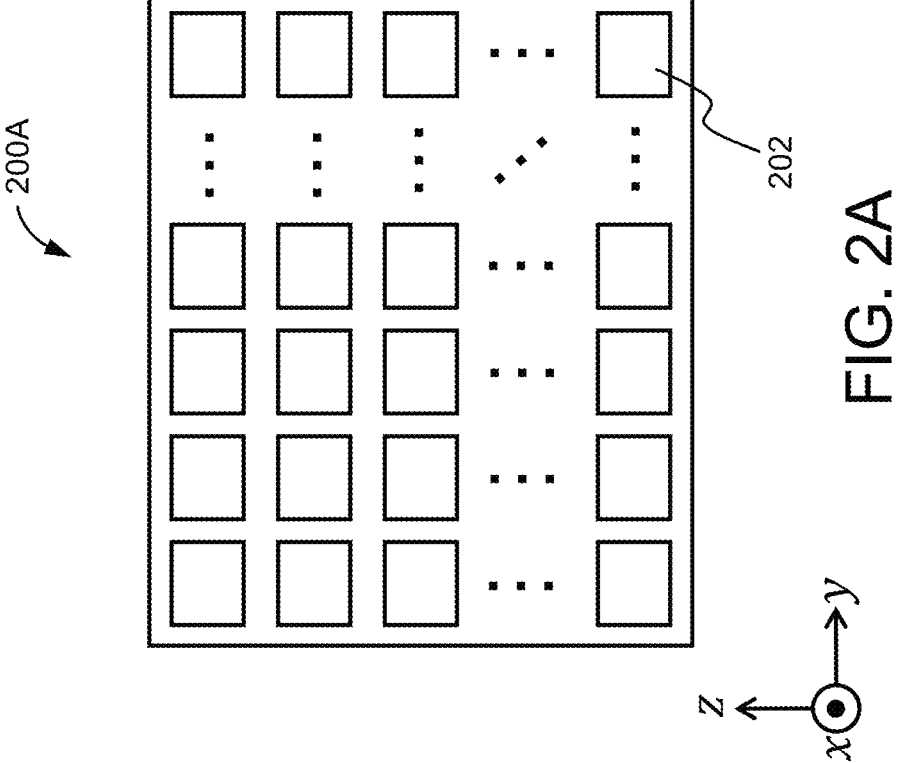
FIGS. 2A-2D are schematic diagrams of example modulators comprising a plurality of modulating elements.

In some examples, a plurality of modulating elements, i.e., linear optical elements, can be arranged over a two-dimensional (2D) plane. Linear optical elements can be configured to provide or apply a change in an amplitude or a phase of an optical wave interacting with the linear optical element, where the change in an amplitude or a phase is a linear function of an amplitude or a phase of the optical wave (i.e., where the change the amplitude or phase does not itself depend on the amplitude or phase of the optical wave, or on any other optical wave interacting with the linear optical element). FIG. 2A depicts an example modulator 200A comprising a plurality of modulating elements, i.e., modulating elements 202 arranged over a two-dimensional plane. In this example, modulating elements 202 are arranged over the yz-plane. In other words, the plurality of modulating elements is coplanar with a plane.

Figure 2C:
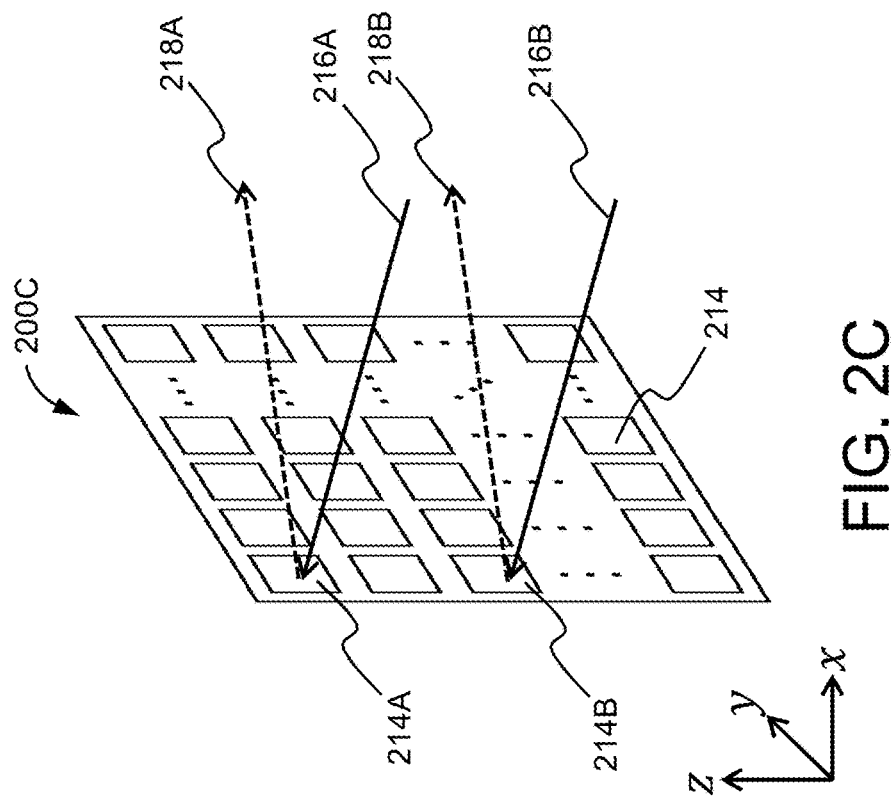
Figure 2B:
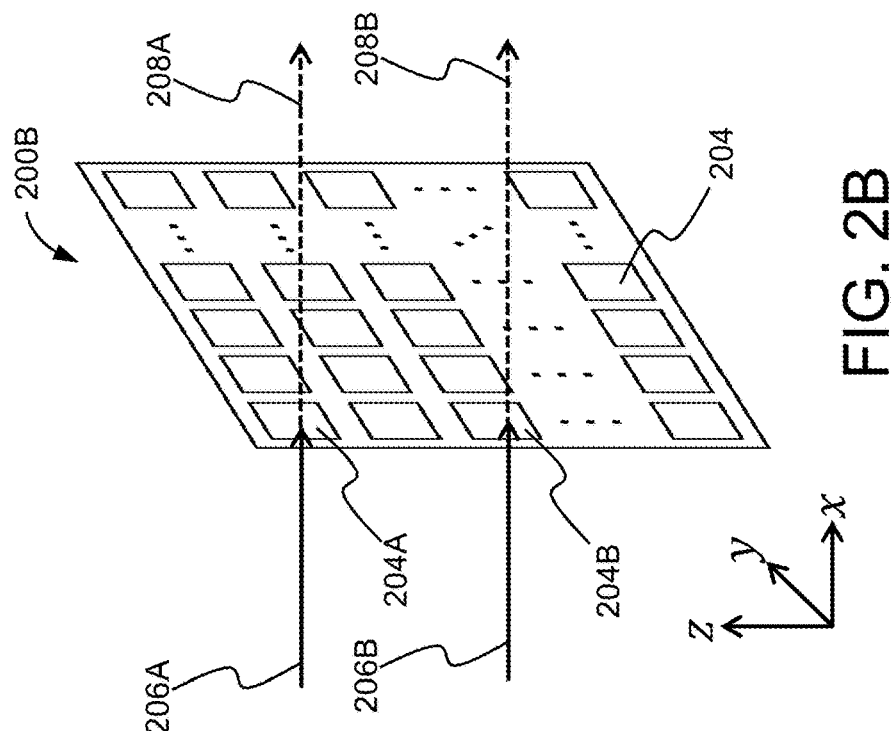

Some modulating elements can comprise a transmissive modulating element configured to apply a modulation to an optical wave propagating through the transmissive modulating element. FIG. 2B depicts an example modulator 200B comprising a plurality of transmissive modulating elements 204. A modulating element 204A of the plurality of transmissive modulating elements applies a modulation to an optical wave 206A to produce a modulated optical wave 208A and a modulating element 204B of the plurality of transmissive modulating elements applies a modulation to an optical wave 206B to produce a modulated optical wave 208B. As shown in FIG. 2B, the optical wave 206A, the optical wave 206B, the modulated optical wave 208A, and the modulated optical wave 208A each have propagation axes that are perpendicular to the plane that is coplanar with the plurality of transmissive modulating elements, also referred to as the transverse plane, in that the plane is transverse to the propagation axis of an optical wave. In some examples, the modulator 200B can be referred to a spatial light modulator.

Some modulating elements can be at least partially reflective such that the modulating element is configured to apply a modulation to an optical wave reflected by the modulating element. FIG. 2C depicts an example modulator 200C comprising a plurality of reflective modulating elements 214. A modulating element 214A of the plurality of transmissive modulating elements applies a modulation to an optical wave 216A to produce a modulated optical wave 218A and a modulating element 214B of the plurality of transmissive modulating elements applies a modulation to an optical wave 216B to produce a modulated optical wave 218B. In some examples, the modulator 200B can be referred to a spatial light modulator.

In some implementations, a plurality of modulating elements can be arranged over a plurality of modulators. FIG.

2D depicts an example system 200D comprising a plurality of modulators 220A-220N, i.e., a modulator 220A, a modulator 220B, and a modulator 220N. Each modulator of the plurality of modulators 220A-220N comprises a respective plurality of modulating elements 222 arranged over a respective two-dimensional plane. In this example, each of the planes is substantially perpendicular to a common axis 224.

In some implementations, a plurality of modulating elements arranged as a plurality of modulators can be used to form a mode sorter. A mode sorter can be configured to convert optical modes associated with input optical waves into optical modes of a sorted mode distribution. Some modulators of a mode sorter can be configured such that a spatial distribution of modulating elements, sometimes referred to as a mask, selectively modulates an optical wave. In some examples, each modulator of a mode sorter module can have a spatial distribution of modulating elements such that optical modes of propagating light collectively interfere and produce a sorted mode distribution. In other words, each modulator can be configured to apply a modulation to an optical wave based on the sorted mode distribution. Some implementations of mode sorters can include transmissive masks, and some implementations of mode sorters can include reflective masks (e.g., as in the example systems of FIGS. 6A and 6B), or a combination of both. In some examples, optical modes can be described using functions such as Hermite Gaussian functions or Laguerre Gaussian functions. Some sorted mode distributions can comprise optical modes that are orthogonal to each other optical mode of the sorted mode distribution. Some sorted mode distributions can comprise optical modes that correspond to some respective optical input patterns that have been programmed to be recognized (e.g., after setting the modulations based on training of the patterns to be recognized).

Some mode sorter modules can be configured based on one or more configuration parameters. In some examples, configuration parameters can be associated with spatial distributions of modulating elements of a modulator.

Figure 3:
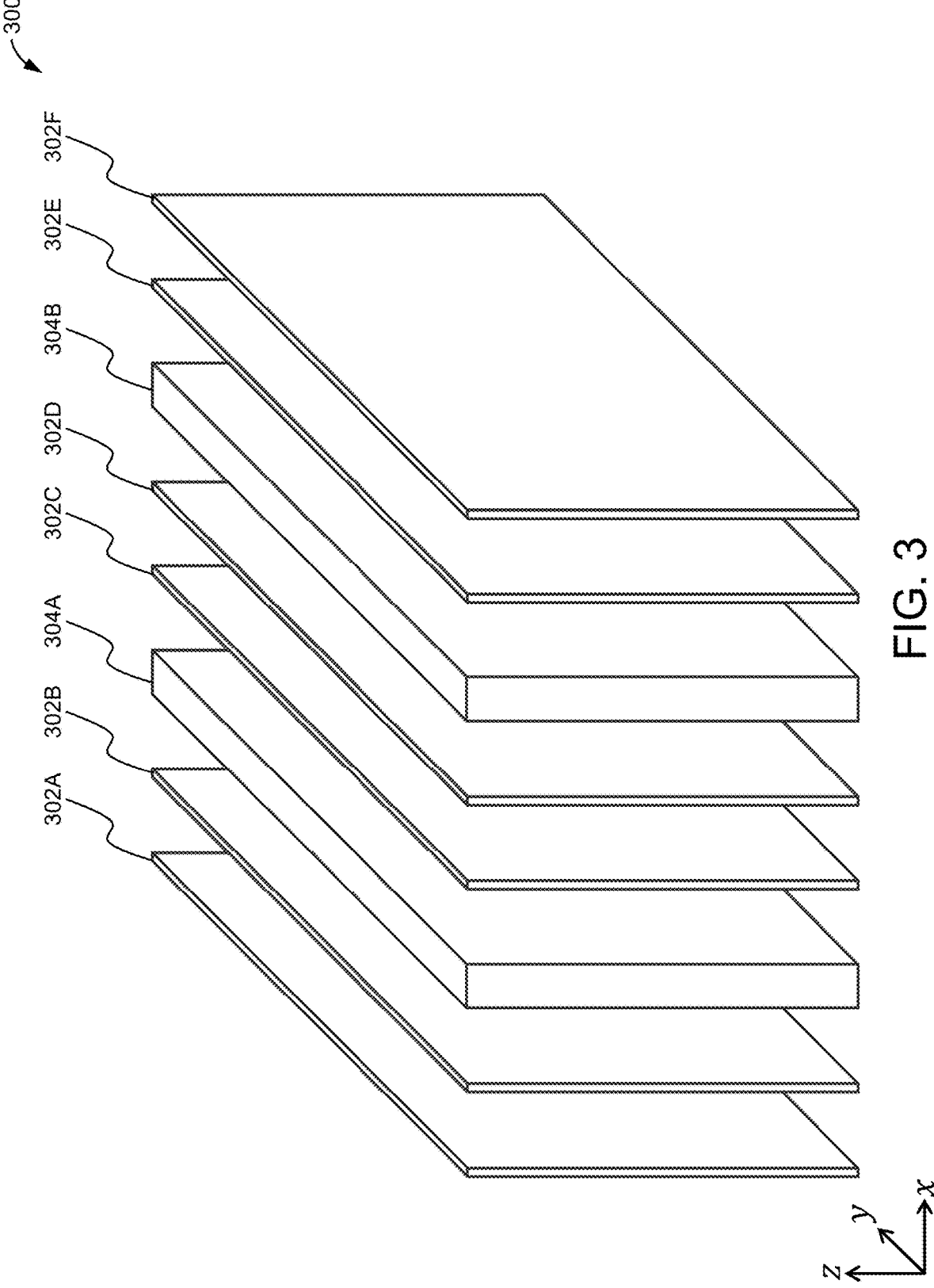
FIG. 3 is a schematic diagram of an example optical neural network.

FIG. 3 depicts an example system 300 comprising a plurality of modulating elements and a plurality of nonlinear optical elements. In this example, the plurality of modulating elements are arranged over a plurality of spatial light modulators 302A-302F, i.e., a spatial light modulator 302A, a spatial light modulator 302B, a spatial light modulator 302C, a spatial light modulator 302D, a spatial light modulator 302E, and a spatial light modulator 302F. Each spatial light modulator of the plurality of spatial light modulators 302A-302F comprises a respective plurality of modulating elements arranged in a two-dimensional configuration as shown in FIGS. 2A-2B. The system 300 further comprises one or more optical activation units 304A-304B, i.e., an optical activation unit 304A and an optical activation unit 304B. Each optical activation unit of the one or more optical activation units 304A-304B can comprise a respective plurality of nonlinear optical elements arranged in a two-dimensional configuration. Alternatively, in some implementations, an optical activation unit can be configured to apply a nonlinear optical transformation uniformly over the transverse plane, e.g., using a single large nonlinear optical element. As shown in FIG. 3, the optical activation units of the one or more optical activation units 304A-304B are interspersed between sets of spatial light modulators of the plurality of spatial light modulators 302A-302F. In other words, the optical activation unit 304A is between a set of spatial light modulators comprising the spatial light modulator 302A and the spatial light modulator 302B and a set of spatial light modulators comprising the spatial light modulator 302C and the spatial light modulator 302D. The optical activation unit 304B is between the set of spatial light modulators comprising the spatial light modulator 302C and the spatial light modulator 302D and a set of spatial light modulators comprising the spatial light modulator 302E and the spatial light modulator 302F. In other words, one or more nonlinear optical elements of the plurality of nonlinear optical elements in an optical activation unit are arranged to interact with a portion of an optical wave between successive interactions of the portion of the optical wave with two modulating elements of the plurality of modulating elements in spatial light modulators on either side of the optical activation unit.

Figure 2D:
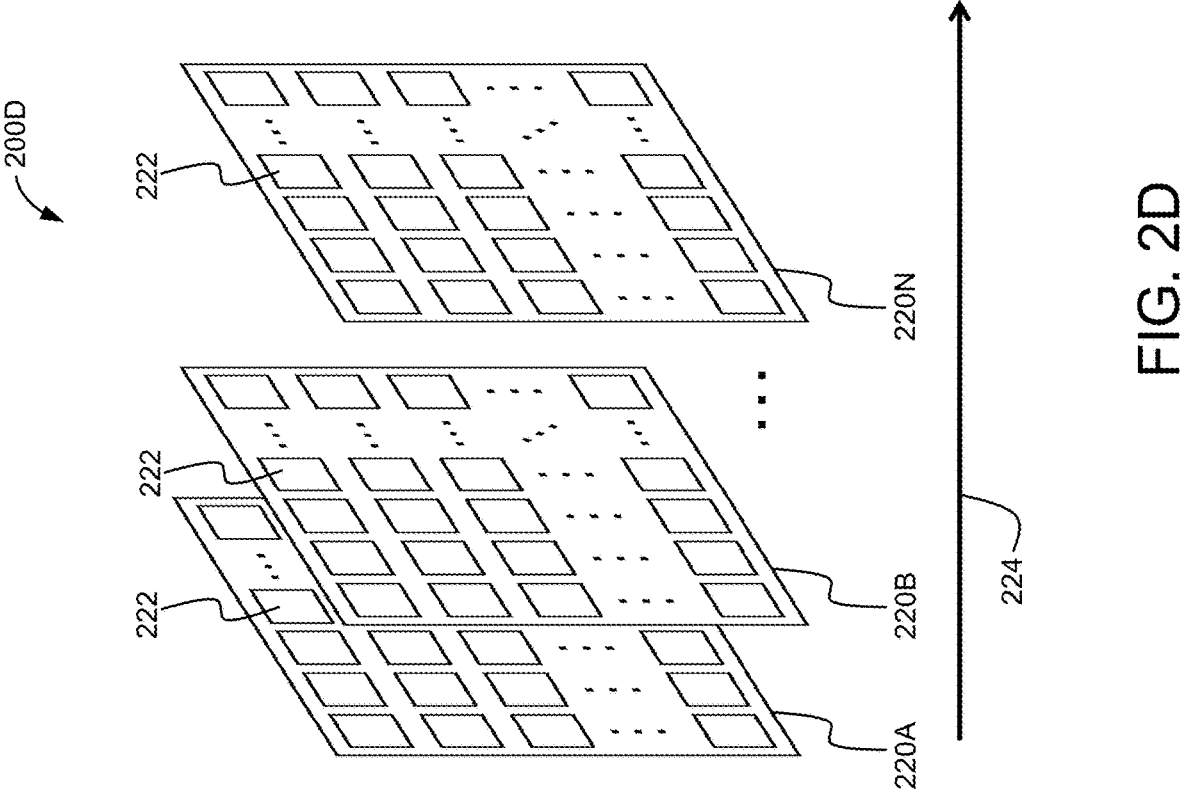
Figure 4A:
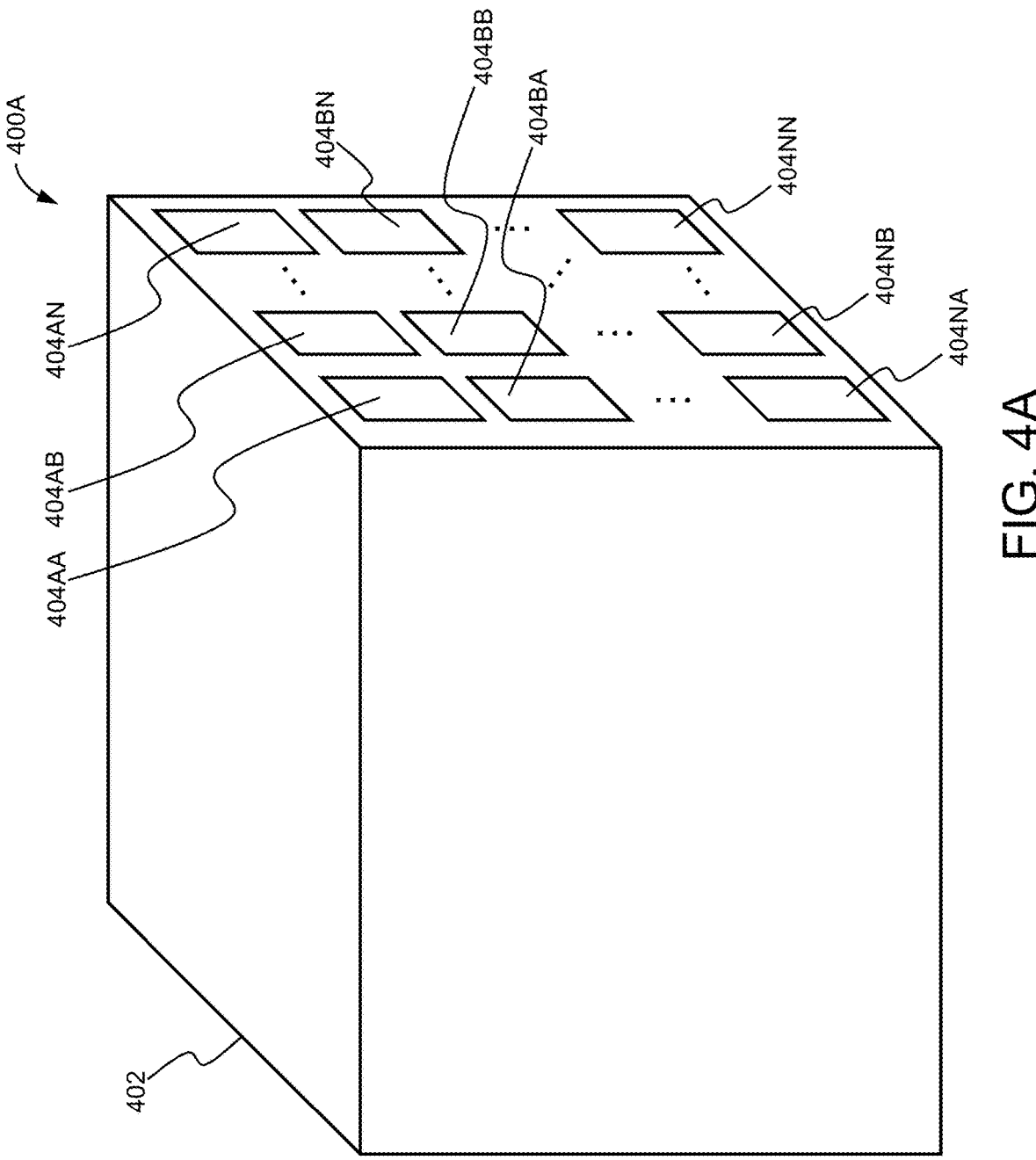
FIG. 4A is a schematic diagram of an example mode sorter.
Figure 4B:
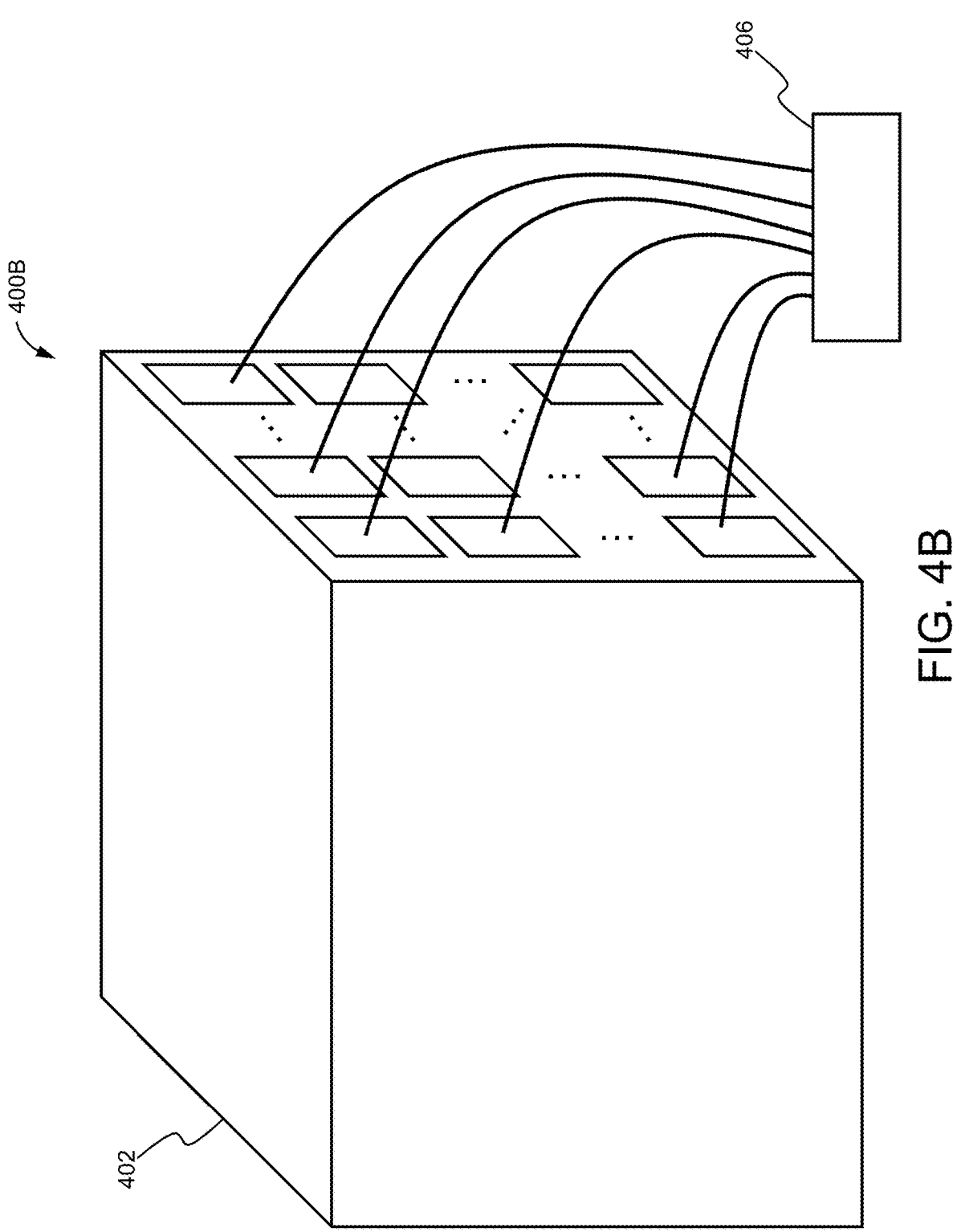
FIG. 4B is a schematic diagram of an example system comprising a mode sorter and
  photonic circuit.

FIG. 4A depicts an example system 400A comprising a mode sorter 402. The mode sorter 402 is configured to sort optical waves in one or more optical modes of a sorted mode distribution. Some mode sorter modules can comprise similar configurations as depicted in FIG. 2D, FIG. 3, or as depicted later in FIGS. 6A-6B. In this example, the sorted mode distribution comprises a plurality of optical modes 404$ij$, where i is an index of the optical mode in a row of the sorted mode distribution and j is an index of an optical mode in a column of the sorted mode distribution. In this example, the different optical modes at the output of the mode sorter 402 have been spatially separated and arranged over the output transverse plane. In some examples, the optical modes may have the same propagation axes, or in other examples, the optical modes may have been sorted such that they exit with different respective propagation axes. In some examples, one or more optical modes of the plurality of optical modes of a sorted mode distribution can be routed or coupled into an integrated circuit or photonic integrated circuit comprising optical components configured to manipulate optical waves. FIG. 4B depicts an example system 400B wherein one or more optical modes associated with the mode sorter 402 are coupled into a device 406, i.e., a photonic integrated circuit. In some implementations, each optical mode can be routed to optical waveguides of the device 406 via an optical fiber.

In some examples, routing an optical mode to an optical waveguide using an optical fiber can comprise an alignment procedure between one or more of: the optical fiber and the optical mode, or the optical fiber and the optical waveguide. Some alignment procedures can involve coupling an optical mode into an optical fiber or coupling the optical fiber into the optical wave. In some implementations, coupling can comprise, for each optical mode of a plurality of optical modes, aligning an optical fiber to receive at least a portion of an optical wave associated with that mode of the plurality of optical modes. The optical fiber can then be aligned to provide the at least a portion of the optical wave associated with the mode of the plurality of optical modes to an input port, or an optical waveguide. Some implementations of optical fiber alignment can comprise translating an end or a tip of an optical fiber relative to an optical beam, optical mode, or optical waveguide while monitoring optical power transmitted through the optical fiber or optical waveguide. Such implementations can be used to obtain a desired optical power coupled between components.

Figure 5A:
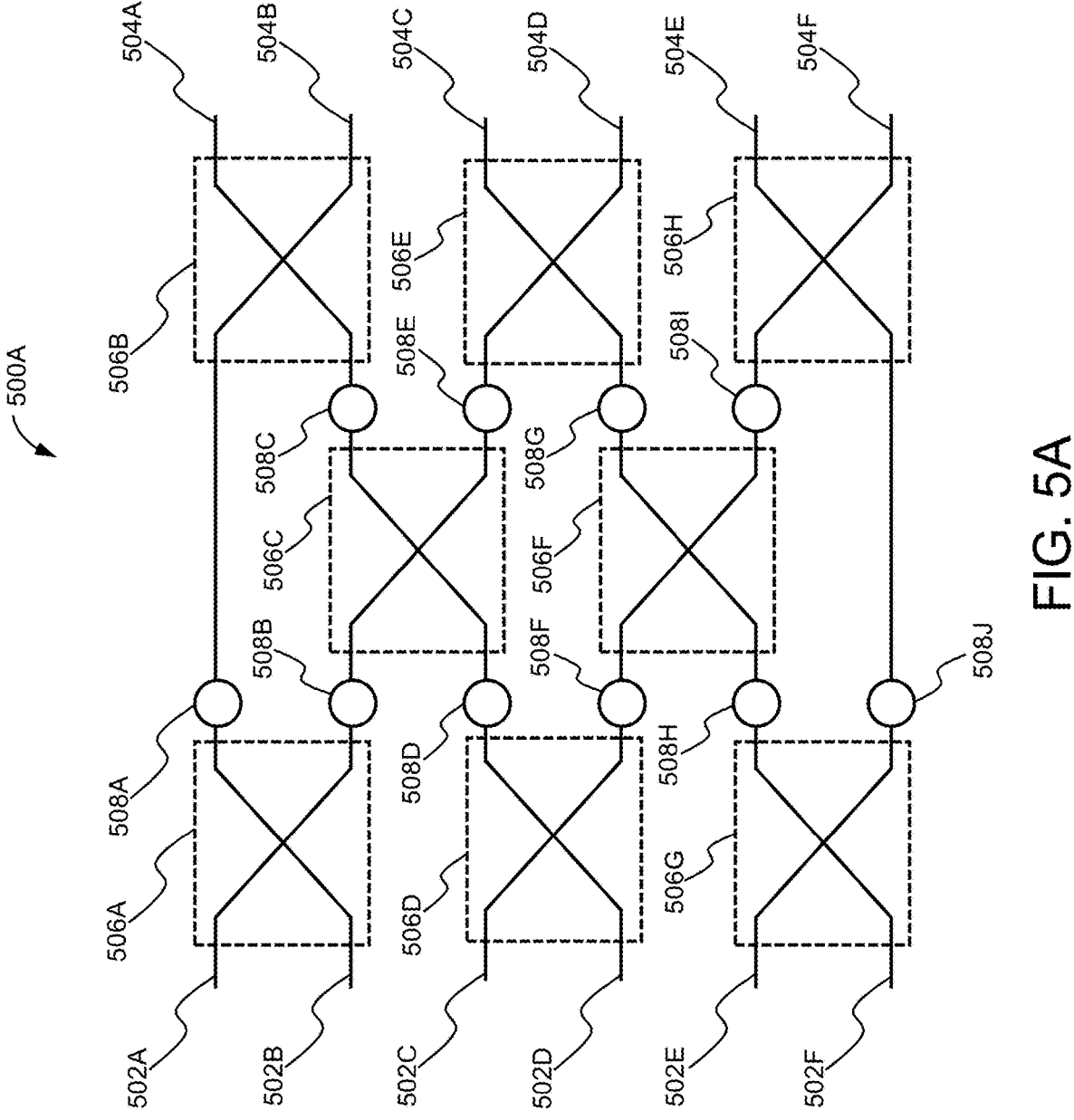
FIG. 5A is a schematic diagram of an example system comprising a plurality of tunable linear optical elements.

In some examples, a photonic integrated circuit can comprise optical components or optical structures configured to perform operations. For instance, a photonic integrated circuit can comprise tunable linear optical modules and nonlinear optical portions. FIG. 5A depicts an example optical circuit 500A comprising a plurality of input ports 502A-502F, i.e., an input port 502A, an input port 502B, an input port 502C, an input port 502D, an input port 502E, and an input port 502F. The optical circuit 500A further comprises a plurality of output ports 504A-504F, i.e., an output port 504A, an output port 504B, an output port 504C, an output port 504D, an output port 504E, and an output port 504F. The optical circuit 500A further comprises a plurality of tunable linear optical modules 506A-506H, i.e., a tunable linear optical module 506A, a tunable linear optical module 506B, a tunable linear optical module 506C, a tunable linear optical module 506D, a tunable linear optical module 506E, a tunable linear optical module 506F, a tunable linear optical module 506G, and a tunable linear optical module 506H. Each tunable linear optical module of the plurality of tunable linear optical modules 506A-507H comprises at least two inputs and at least two outputs. The optical circuit 500A further comprises a plurality of nonlinear optical portions 508A-508J, i.e., a nonlinear optical portion 508A, a nonlinear optical portion 508B, a nonlinear optical portion 508C, a nonlinear optical portion 508D, a nonlinear optical portion 508E, a nonlinear optical portion 508F, a nonlinear optical portion 508G, a nonlinear optical portion 508H, a nonlinear optical portion 508I, and a nonlinear optical portion 508J. Each output of each tunable linear optical module of the plurality of tunable linear optical modules 506A-506H is connected to an output port of the plurality of output ports 504A-504F or to an input of another tunable linear optical module of the plurality of tunable linear optical modules 506A-506H by a nonlinear optical portion of the plurality of nonlinear optical portions 508A-508J. Each input port of the plurality of input ports 502A-502F is connected to an input of a tunable linear optical module of the plurality of tunable linear optical modules 506A-506H. While the optical circuit 500A comprises eight tunable linear optical modules, some implementations can comprise fewer than eight or more than eight tunable linear optical modules.

Figure 5B:
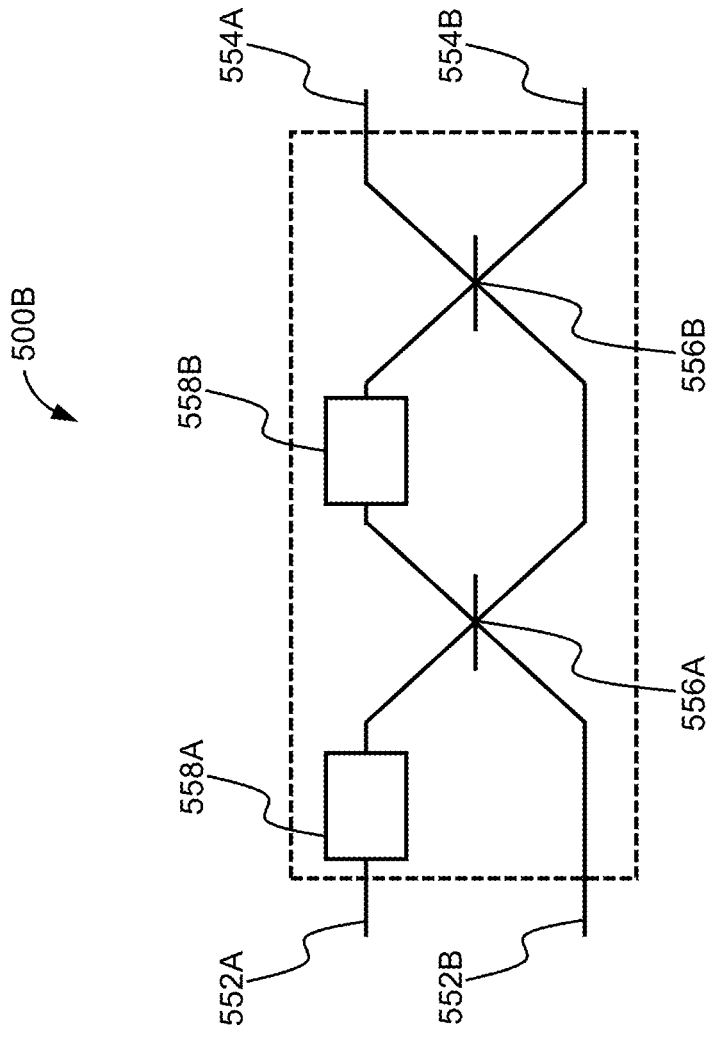
FIG. 5B is a schematic diagram of an example tunable interferometer.

FIG. 5B depicts an example tunable interferometer module 500B that can be used as each tunable linear optical module in FIG. 5A. The tunable interferometer module 500B comprises an input 552A, an input 552B, an output 554A, and an output 554B. The tunable interferometer module 500B further comprises a first optical beamsplitter 556A and a second optical beamsplitter 556B. The first optical beamsplitter 556A is in optical communication with each of the input 552A and the input 552B. The first optical beamsplitter 556A and the second optical beamsplitter 556B are in optical communication. The second optical beamsplitter 556B is in optical communication with each of the output 554A and the output 554B. The tunable interferometer module 500B further comprises a first phase shifter 558A configured to apply a phase shift to an optical wave propagating through the first phase shifter 558A and a second phase shifter 558B configured to apply a phase shift to an optical wave propagating through the second phase shifter 558B.

Figure 6A:
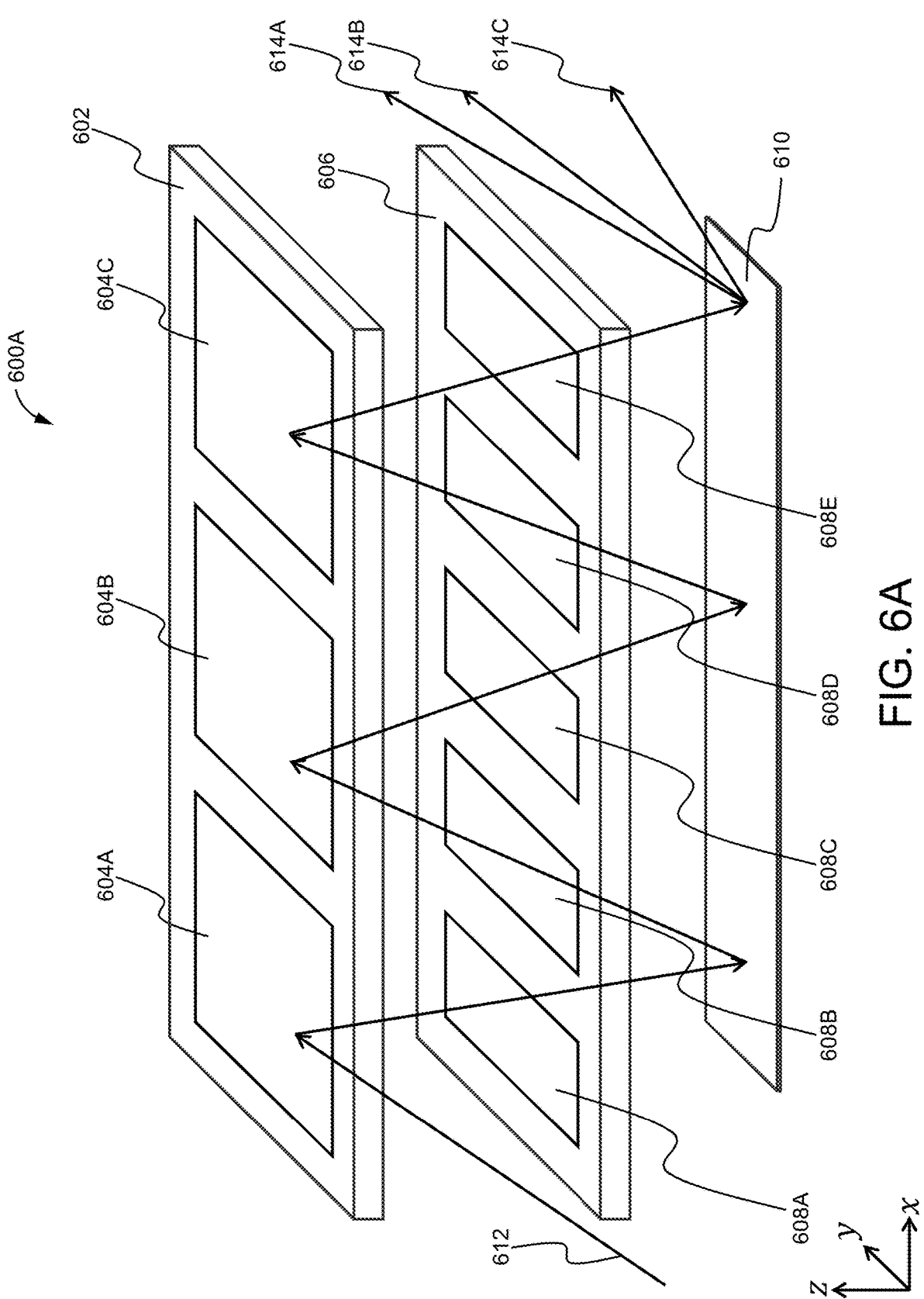
FIGS. 6A-6B are schematic diagrams of example optical neural networks.

FIG. 6A depicts an example system 600A. The system 600A comprises a modulator 602 comprising a plurality of modulating elements, i.e., linear optical elements, where each modulating element is configured to apply a phase modulation or an amplitude modulation to an optical wave interacting with that modulating element. The plurality of modulating elements is arranged over a two-dimensional plane in sets of modulating elements. In other words, the modulator 602 comprises a set of modulating elements 604A, a set of modulating elements 604B, and a set of modulating elements 604C. The system 600A further comprises an optical activation unit 606 comprising a plurality of nonlinear optical elements, where each nonlinear optical element is configured to apply a change in intensity of an optical wave interacting with that nonlinear optical element. The plurality of nonlinear optical elements is arranged over a two-dimensional plane in sets of nonlinear optical elements. In other words, the optical activation unit 606 comprises a set of nonlinear optical elements 608A, a set of nonlinear optical elements 608B, a set of nonlinear optical elements 608C, a set of nonlinear optical elements 608D, and a set of nonlinear optical elements 608E. The system 600A further comprises a reflective element 610 having a surface that is at least partially reflective. In this example, the plurality of modulating elements, the plurality of nonlinear optical elements, and the reflective surface are each coplanar with a respective plane. Each of the planes is substantially parallel with each other. An optical wave 612 is coupled into the system 600A. The plurality of modulating elements is configured to sort optical waves into one or more optical modes of a sorted mode distribution. In this example, the sorted mode distribution comprises a plurality of optical modes 614A-614C, i.e., an optical mode 614A, an optical mode 614B, and an optical mode 614C.

In some examples, one or more sets of nonlinear optical elements can be configured to interact with an optical wave while other sets do not. For instance, in this example, the set of nonlinear optical elements 608C, while the set of nonlinear optical elements 608A, the set of nonlinear optical elements 608C, the set of nonlinear optical elements 608E do not interact with the optical wave. In some examples, an interaction of an optical wave with a nonlinear optical element can be weak such that multiple interactions of an optical wave with a nonlinear optical element can compensate for the weak interaction. By way of example, an optical wave can interact with the set of nonlinear optical elements 608A and the set of nonlinear optical elements 608B before interacting with the set of modulating elements 604B.

Figure 6B:
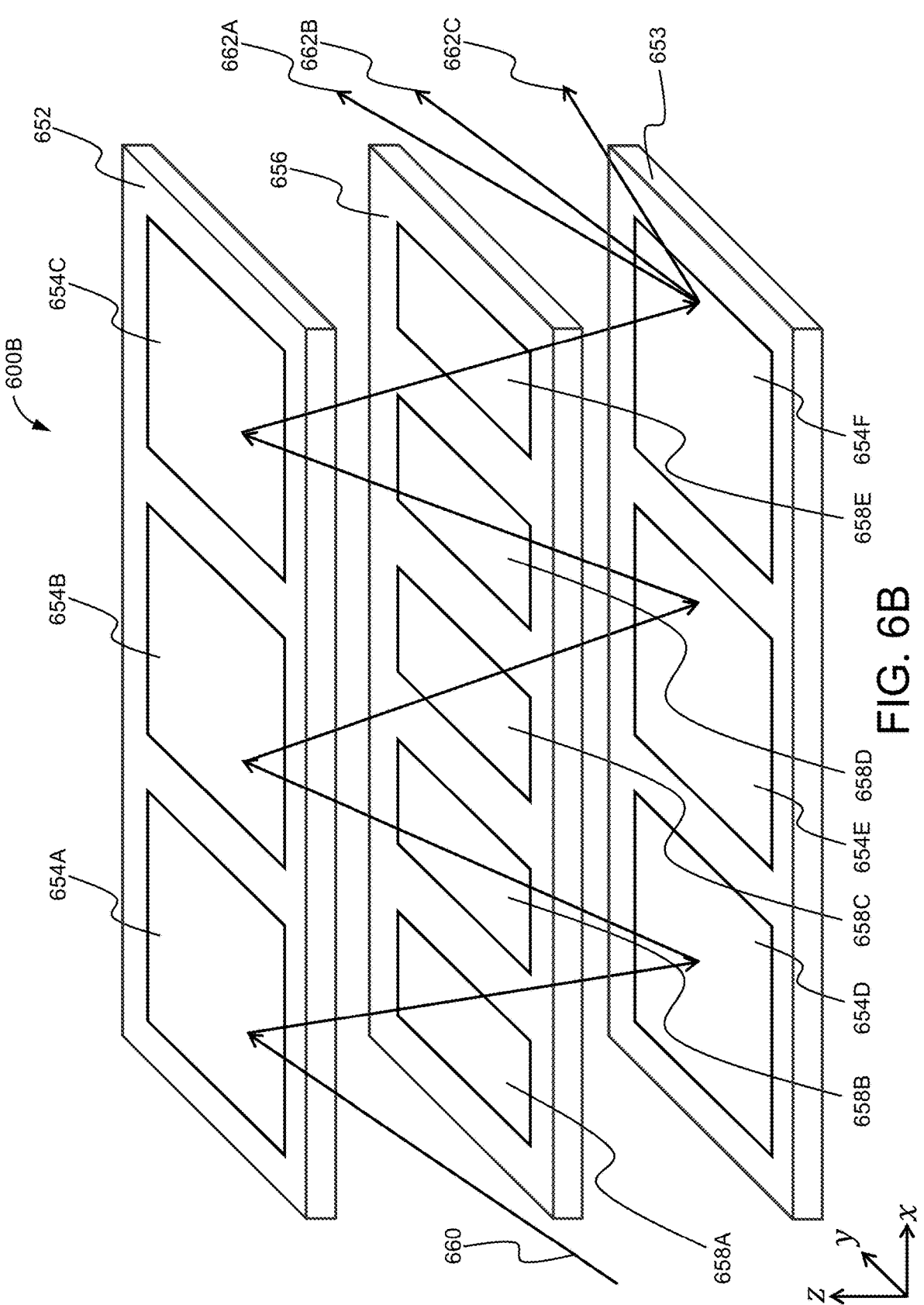

FIG. 6B depicts an example system 600B. The system 600B comprises a first modulator 652 and a second modulator 653 comprising a plurality of modulating elements, i.e., linear optical elements, where each modulating element is configured to apply a phase modulation or an amplitude modulation to an optical wave interacting with that modulating element. The plurality of modulating elements is arranged over a first two-dimensional plane and a second two dimensional-plane in sets of modulating elements. In other words, the first modulator 652 comprises a set of modulating elements 654A, a set of modulating elements 654B, and a set of modulating elements 654C. The second modulator 653 comprises a set of modulating elements 654D, a set of modulating elements 654E, and a set of modulating element 654F. The system 600B further comprises an optical activation unit 656 comprising a plurality of nonlinear optical elements, where each nonlinear optical element is configured to apply a change in intensity of an optical wave interacting with that nonlinear optical element. The plurality of nonlinear optical elements is arranged over a two-dimensional plane in sets of nonlinear optical elements. In other words, the optical activation unit 656 comprises a set of nonlinear optical elements 658A, a set of nonlinear optical elements 658B, a set of nonlinear optical elements 658C, a set of nonlinear optical elements 658D, and a set of nonlinear optical elements 658E. In this example, the modulating elements of the first modulator 652, the plurality of nonlinear optical elements, and the modulating elements of the second modulator 653 are each coplanar with a respective plane. Each of the planes is substantially parallel with each other. An optical wave 660 is coupled into the system 600B. The plurality of modulating elements of the first modulator 652 and the second modulator 653 is configured to sort optical waves into one or more optical modes of a sorted mode distribution. In this example, the sorted mode distribution comprises a plurality of optical modes 662A-662C, i.e., an optical mode 662A, an optical mode 662B, and an optical mode 662C.

Some systems configured to manipulate optical waves can comprise semiconductor materials such as silicon or III/V compounds. Some examples of III/V compounds comprise elements from group III of the periodic table, such as boron, aluminum, gallium, or indium. Some examples of III/V compounds comprise elements from group V of the periodic table, such as nitrogen, phosphorous, arsenic, or antimony. Some devices can comprise semiconductor materials that are doped with p-type or n-type dopants. By way of example, p-type dopants can comprise elements such as tin, germanium, silicon, tellurium, and sulfur. By way of example, n-type dopants can comprise elements such as zinc, cadmium, beryllium, and magnesium.

Figure 7A:
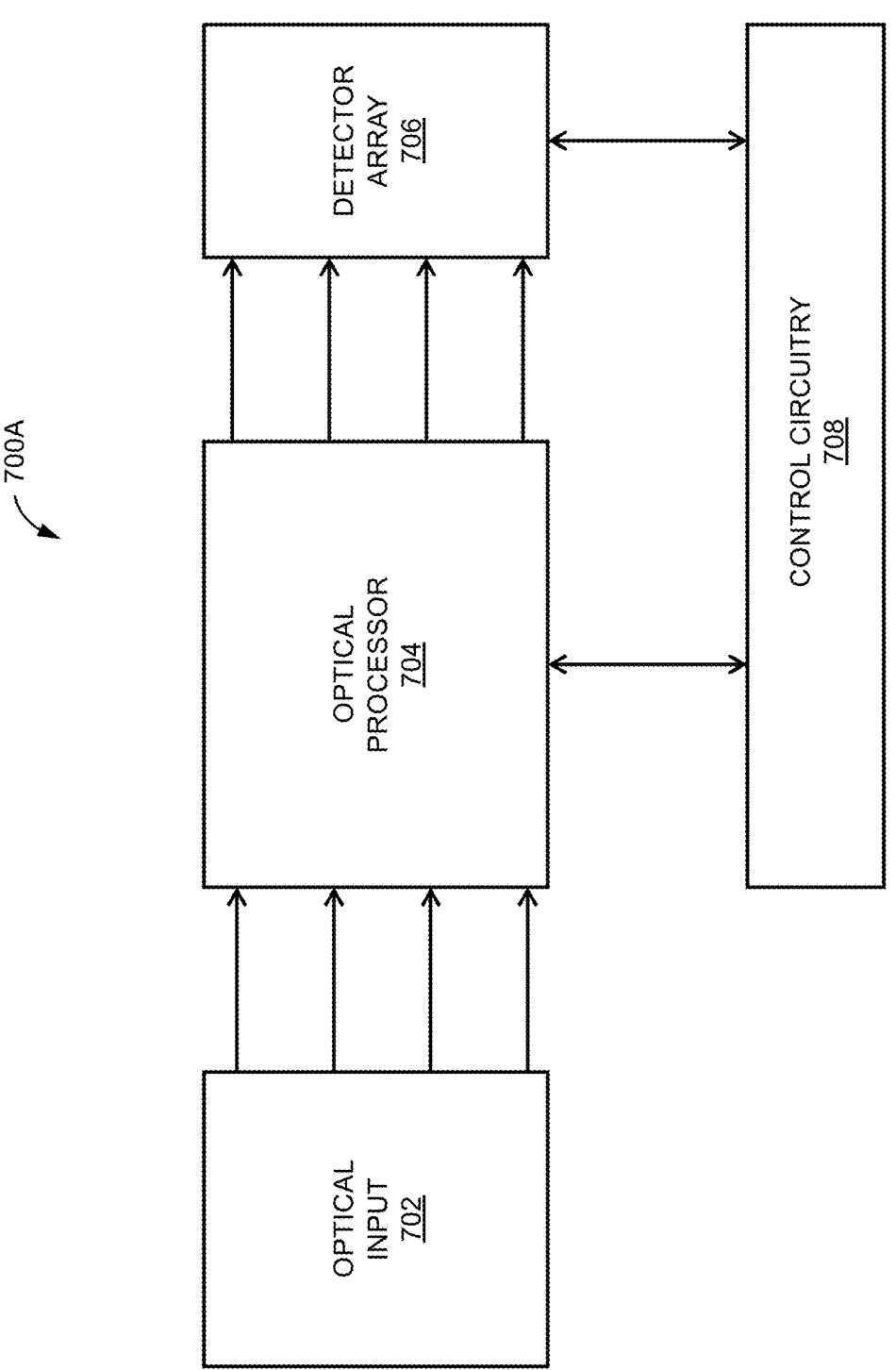
FIGS. 7A-7B are schematic diagrams of example systems comprising optical processors.

FIG. 7A depicts an example system 700A configured to process optical waves. The system 700A comprises an optical input 702 configured to provide optical waves to an optical processor 704, i.e., an optical neural network. Some optical inputs can comprise a coherent light source, i.e., a laser, an incoherent light source, i.e., light from objects in a field-of-view. In some examples, a system configured to receive light from objects in a field-of-view can be referred to as a passive imaging system. In some implementations the optical processor 704 can comprise any of the systems depicted in FIGS. 3, 4A-4B, 5A-5B, and 6A-6B. A detector array 706 is configured to receive optical waves from the optical processor 704. In some implementations, the detector array 706 can comprise a photodetector array or a plurality of photodetectors, i.e., photodiodes. Control circuitry 708 is configured to control i.e., provide control signals to or receive signals from, each of the optical processor 704 and the detector array 706. In some examples, the optical processor 704, the detector array 706, and the control circuitry 708 can collectively be referred to as an optical sensor.

Figure 7B:
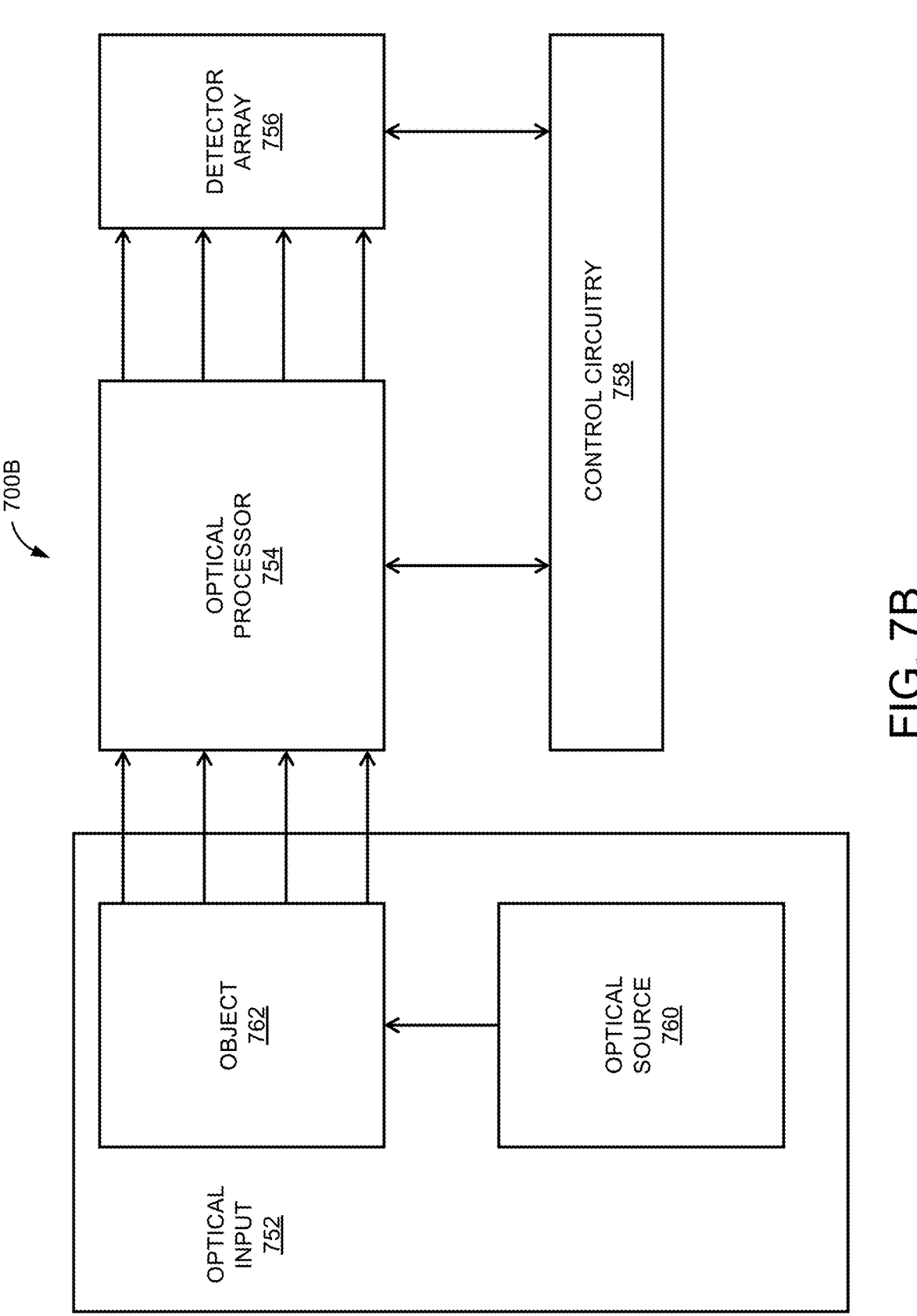

FIG. 7B depicts an example system 700B comprising an optical input 752 that is configured to provide optical waves to an optical processor 754, i.e., an optical neural network. A detector array 756 is configured to receive optical waves from the optical processor 754. Control circuitry 758 is configured to control each of the optical processor 754 and the detector array 756. In this example, the optical input 752 comprises an optical source 760 that illuminates an object 762. The optical processor 754 then receives optical waves from the object 762, i.e., optical waves provided by the optical source 760 that are backscattered or scattered by the object 762.

As previously described, in some examples, nonlinear optical elements of an optical processor can apply a nonlinear amplitude or phase change to an optical wave in response to an applied optical or electric field. In some implementations, an optical source, i.e., a laser, can be directed to one or more nonlinear optical elements of the optical processor to apply an optical field to the one or more nonlinear optical elements. In some implementations, control circuitry can comprise a voltage source configured to apply an electric field to one or more nonlinear optical elements of the optical processor.

In some examples, control circuitry can provide control signals to a component of a system based on a signal received by a component of the system. By way of example, control circuitry can be configured to receive outputs associated with a detector array and configure portions of an optical processor based on the received outputs. In some implementations, control circuitry can control an optical source. For instance, an optical source can comprise a laser and a spatial light modulator configured to tailor a spatial profile of an optical beam emitted by the laser. Control circuitry can be configured to control the spatial profile of the optical beam.

Some systems can include optical elements to precisely tailor the properties of the optical fields or optical waves. Such optical elements can be transmissive or reflective and can be placed at varying angles. In some implementations, the optical elements can be used to separate spurious optical waves from optical waves of interest. Optical elements that can be used to separate optical waves can include, but are not limited to, filtering elements such as: wavelength filters (i.e. edgepass, bandpass) to separate photons with wavelengths outside a desired operating range, polarizing filters to separate photons with polarizations outside a desired operating range, and spatial filters to remove optical waves having undesired spatial modes. By way of example, referring back to FIG. 7A, optical elements can be placed in the system 700A between the optical input 702 and the optical processor 704, between the optical processor 704 and the detector array 706, or some combination thereof.

In some implementations, the systems shown in FIGS. 7A-7B can be utilized as optical sensors to detect objects in a field-of-view. In such implementations, imaging optical elements, such as one or more optical lenses, can be placed in between an object or the objects and the optical processor. In some examples, an optical processor, i.e., an optical neural network, can be configured based on a set of training data, i.e., to recognize certain objects in a field-of-view. The optical sensor can then be deployed to recognize and detect those objects. Some examples of training data sets can be formed by convoluting images of those objects with the point spread function (PSF) of the imaging optical elements. By way of example, an optical sensor can be included in light detection and ranging (LiDAR) system or to monitor manufacturing processes.

Figure 8A:
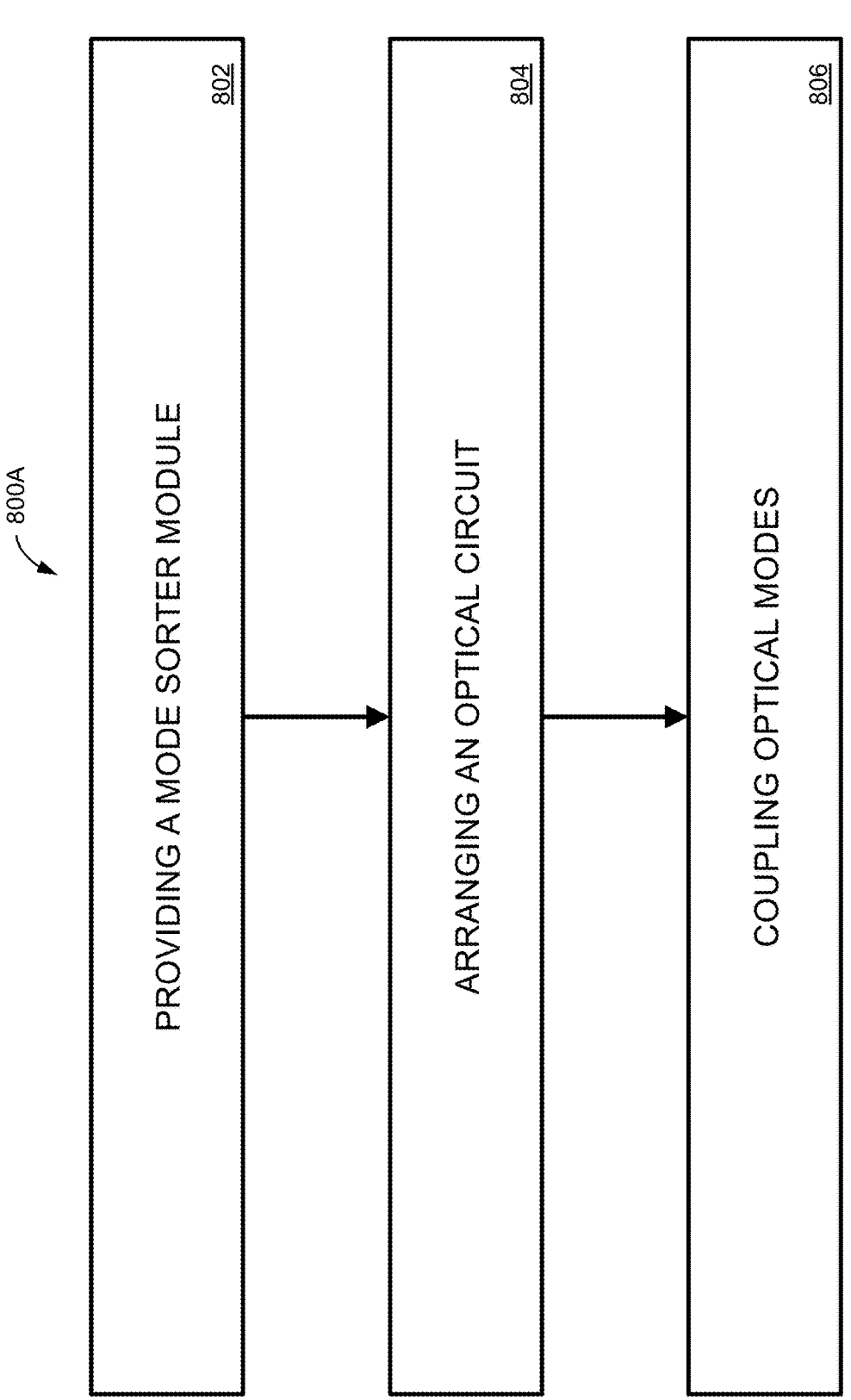
FIGS. 8A-8B are flowcharts of example methods.

FIG. 8A depicts a flowchart of an example method 800A. The method 800A comprises providing 802 a mode sorter module configured to sort optical waves into one or more optical modes of a plurality of optical modes of a sorted mode distribution. The method 800A further comprises arranging 804 an optical circuit. In some examples, the optical circuit can comprise a plurality of input ports, a plurality of tunable linear optical modules, each tunable linear optical module of the plurality of tunable linear optical modules comprising one or more inputs and one or more outputs, a plurality of nonlinear optical portions, where each nonlinear optical portion of the plurality of nonlinear optical portions is configured to provide a change in an amplitude or a phase of an optical wave propagating through that nonlinear optical portion of the plurality of nonlinear optical portions, and a plurality of output ports. The method 800A further comprises coupling 806 optical modes. In some examples, each optical mode of the plurality of optical modes of the sorted mode distribution can be coupled into a respective input port of the plurality of input ports of the optical circuit.

Figure 8B:
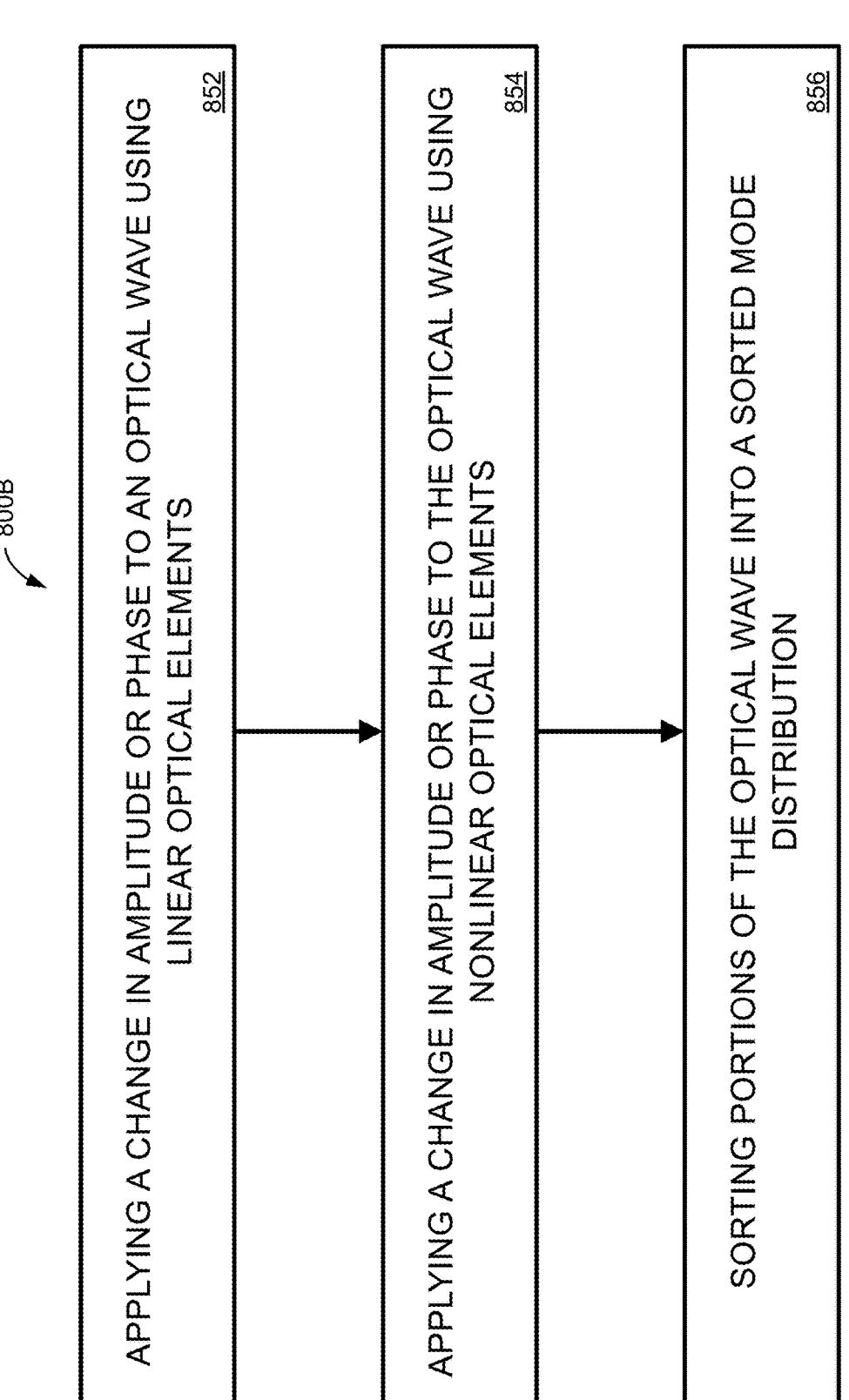

FIG. 8B depicts a flowchart of an example method 800B. The method 800B comprises applying 852 to an optical wave, using each linear optical elements of a plurality of linear optical elements, a change in amplitude or phase of the optical wave interacting with that linear optical element of the plurality of linear optical elements. The method 800B further comprises applying 854 to the optical wave, using each nonlinear optical element of a plurality of nonlinear optical elements, a change in an amplitude or a phase of the optical wave interacting with that nonlinear optical element of the plurality of nonlinear optical elements, where the change in an amplitude or a phase is a nonlinear function of an amplitude or a phase of the optical wav. The method 800B further comprises sorting 856 portions of the optical wave into one or more optical modes of a sorted mode distribution. In some examples, the sorting can be based at least in part on a collective change in amplitude or phase applied to the optical wave using the plurality of linear optical elements. In some examples, one or more nonlinear optical elements of the plurality of nonlinear optical elements can be arranged to interact with the optical wave between successive interactions of the optical wave with two linear optical elements of the plurality of linear optical elements.

Some systems can comprise analog, digital, or mixed-signal circuitry configured to perform functions such as signal processing, voltage regulation, or data acquisition. Some systems can comprise interface or control circuitry configured to perform functions such as applying bias voltages, measuring voltages, or interfacing with components of the system. In some examples, control circuitry can be implemented in one or more dedicated regions of an integrated circuit, or distributed throughout an integrated circuit architecture. In some examples, control circuitry can comprise components such as a field-programmable gate array (FPGA), an application specific integrated circuit (ASIC), one or more processors or processor cores, including central processing unit(s) (CPU(s)) and/or graphics processing unit (s) (GPU(s)), or other computing devices or modules capable of executing a program (e.g., software and/or firmware) comprising instructions or other compiled or executable code. The electronic circuitry can also include at least one data storage system (e.g., including volatile and non-volatile memory, and/or storage media). The program may be provided on a computer-readable storage medium, or delivered over a communication medium such as a wired or wireless network, to a device module where it can be stored and eventually executed when read by the device to perform the procedures of the program.

In some implementations, portions of a system can be arranged in a flip-chip configuration to allow for three-dimensional integration of multiple chips or substrates. Some flip-chip configurations comprise conductive structure such as wire bonds, microbumps, or vias to facilitate electrical communication between multiple layers or chips.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:
   an optical input configured to provide an input optical wave being characterized by a plurality of optical modes;
   a mode sorter module configured to convert the plurality of optical modes of the input optical wave into a plurality of separated optical modes of a sorted mode distribution, where the separated optical modes are associated with a plurality of optical waves having different respective propagation axes; and an optical circuit comprising a plurality of input ports, where each input port of the plurality of input ports is configured to receive a respective mode of the plurality of optical modes of the sorted mode distribution, a plurality of tunable linear optical modules, each tunable linear optical module of the plurality of tunable linear optical modules comprising one or more inputs and one or more outputs, a plurality of nonlinear optical portions, where each nonlinear optical portion of the plurality of nonlinear optical portions is configured to provide a change in an amplitude or a phase of an optical wave propagating through that nonlinear optical portion of the plurality of nonlinear optical portions, and a plurality of output ports;

wherein each output of each tunable linear optical module of the plurality of tunable linear optical modules is connected to an output port of the plurality of output ports or to an input of another tunable linear optical module of the plurality of tunable linear optical modules by a nonlinear optical portion of the plurality of nonlinear optical portions;

wherein each input port of the plurality of input ports is connected to an input of a tunable linear optical module of the plurality of tunable linear optical modules.

2. The apparatus of claim 1, wherein each tunable linear optical module of the plurality of tunable linear optical modules comprises a tunable interferometer module comprising at least two inputs and at least two outputs.

3. The apparatus of claim 2, wherein each tunable interferometer module comprises a first optical beamsplitter and a second optical beamsplitter, where the first optical beamsplitter is in optical communication with two inputs of the at least two inputs of that tunable interferometer module, the first optical beamsplitter is in optical communication with the second optical beamsplitter, and the second optical beamsplitter is in optical communication with two outputs of the at least two outputs of that tunable interferometer module.

4. The apparatus of claim 3, wherein each tunable interferometer module comprises a first phase shifter configured to apply a phase shift to an optical wave propagating through the first phase shifter and a second phase shifter configured to apply a phase shift to an optical wave propagating through the second phase shifter.

5. The apparatus of claim 4, wherein the first phase shifter is in optical communication with an input of the at least two inputs of that tunable interferometer module and the second phase shifter is in optical communication with each of the first optical beamsplitter and the second optical beamsplitter of that tunable interferometer module.

6. The apparatus of claim 1, wherein the change in an amplitude or a phase of an optical wave by each nonlinear optical portion of the plurality of nonlinear optical portions is a nonlinear function of an amplitude or a phase of the optical wave.

7. The apparatus of claim 1, wherein the optical circuit comprises optical circuitry on a photonic integrated circuit chip.

8. The apparatus of claim 1, wherein the optical input comprises an imaging system providing light from objects in a field-of-view.

9. The apparatus of claim 8, wherein the imaging system comprises a light source providing light to the objects in the field-of-view.

10. The apparatus of claim 9, wherein the light source comprises a coherent light source.

11. A method comprising:

providing an input optical wave from an optical input, the input optical wave being characterized by a plurality of optical modes;

providing a mode sorter module configured to convert the plurality of optical modes of the input optical wave into a plurality of separated optical modes of a sorted mode distribution, where the separated optical modes are associated with a plurality of optical waves having different respective propagation axes;

arranging an optical circuit comprising a plurality of input ports, a plurality of tunable linear optical modules, each tunable linear optical module of the plurality of tunable linear optical modules comprising one or more inputs and one or more outputs, a plurality of nonlinear optical portions, where each nonlinear optical portion of the plurality of nonlinear optical portions is configured to provide a change in an amplitude or a phase of an optical wave propagating through that nonlinear optical portion of the plurality of nonlinear optical portions, and a plurality of output ports; and coupling each optical mode of the plurality of optical modes of the sorted mode distribution into a respective input port of the plurality of input ports of the optical circuit;

wherein each output of each tunable linear optical module of the plurality of tunable linear optical modules is connected to an output port of the plurality of output ports or to an input of another tunable linear optical module of the plurality of tunable linear optical modules by a nonlinear optical portion of the plurality of nonlinear optical portions;

wherein each input port of the plurality of input ports is connected to an input of a tunable linear optical module of the plurality of tunable linear optical modules.

12. The method of claim 11, wherein the coupling comprises, for each optical mode of the plurality of optical modes, aligning an optical fiber to receive at least a portion of an optical wave associated with that mode of the plurality of optical modes, and aligning the optical fiber to provide the at least a portion of the optical wave associated with the mode of the plurality of optical modes to a respective input port of the plurality of input ports.

13. An apparatus comprising:

a plurality of linear optical elements, where each linear optical element of the plurality of linear optical elements is configured to apply a change in amplitude or phase of an optical wave interacting with that linear optical element of the plurality of linear optical elements; and a plurality of nonlinear optical elements, where each nonlinear optical element of the plurality of nonlinear optical elements is configured to apply a change in an amplitude or a phase of an optical wave interacting with that nonlinear optical element of the plurality of nonlinear optical elements, where the change in an amplitude or a phase is a nonlinear function of an amplitude or a phase of the optical wave;

wherein two or more nonlinear optical elements of the plurality of nonlinear optical elements are arranged to interact with an optical wave between successive inter-actions of the optical wave with two linear optical elements of different respective pairs of linear optical elements in the plurality of linear optical elements;

wherein the plurality of linear optical elements is config-ured to sort optical waves into one or more optical modes of a sorted mode distribution.

14. The apparatus of claim 13, wherein each linear optical element of the plurality of linear optical elements comprises a respective transmissive or reflective linear optical element.

15. The apparatus of claim 13, wherein each of the plurality of linear optical elements and the plurality of nonlinear optical elements are arranged over a respective plurality of planes, where each plane of the plurality of planes is substantially parallel to a common plane that is substantially perpendicular to a propagation direction of an optical wave to which a phase modulation is applied.

16. The apparatus of claim 15, wherein sets of nonlinear optical elements of the plurality of nonlinear optical ele-ments are interspersed between sets of linear optical ele-ments of the plurality of linear optical elements.

17. The apparatus of claim 13, wherein the plurality of linear optical elements is arranged over a first plane and the plurality of nonlinear optical elements is arranged over a second plane that is substantially parallel to the first plane.

18. The apparatus of claim 17, further comprising a reflective optical element that is coplanar with a third plane that is substantially parallel to the first plane, where the plurality of nonlinear optical elements is between the plu-rality of linear optical elements and the reflective optical element.

19. The apparatus of claim 13, wherein the plurality of linear optical elements is configured to sort optical waves into one or more optical modes of the sorted mode distri-bution based at least in part on a set of training data.

20. The apparatus of claim 13, wherein each nonlinear optical element of the plurality of nonlinear optical elements is configured to apply a change in an amplitude or a phase of an optical wave interacting with that nonlinear optical element of the plurality of nonlinear optical elements in response to an electric field or optical field applied to that nonlinear optical element of the plurality of nonlinear opti-cal elements.

21. A method comprising:

applying to an optical wave, using each linear optical elements of a plurality of linear optical elements, a change in amplitude or phase of the optical wave interacting with that linear optical element of the plu-rality of linear optical elements;

applying to the optical wave, using each nonlinear optical element of a plurality of nonlinear optical elements, a change in an amplitude or a phase of the optical wave interacting with that nonlinear optical element of the plurality of nonlinear optical elements, where the change in an amplitude or a phase is a nonlinear function of an amplitude or a phase of the optical wave; and sorting, based at least in part on a collective change in amplitude or phase applied to the optical wave using the plurality of linear optical elements, portions of the optical wave into one or more optical modes of a sorted mode distribution;

wherein two or more nonlinear optical elements of the plurality of nonlinear optical elements are arranged to interact with the optical wave between successive inter-actions of the optical wave with two linear optical elements of different respective pairs of linear optical elements in the plurality of linear optical elements.

22. The method of claim 21, wherein each nonlinear optical element of the plurality of nonlinear optical elements is configured to apply a change in an amplitude or a phase of the optical wave interacting with that nonlinear optical element of the plurality of nonlinear optical elements in response to an electric field or optical field applied to that nonlinear optical element of the plurality of nonlinear opti-cal elements.

23. The method of claim 21, wherein each of the plurality of linear optical elements and the plurality of nonlinear optical elements are arranged over a respective plurality of planes, where each plane of the plurality of planes is substantially parallel to a common plane that is substantially perpendicular to a propagation direction of an optical wave to which a phase modulation is applied.

* * * * *